United States Patent
Kawahara et al.

(10) Patent No.: US 9,076,124 B2
(45) Date of Patent: Jul. 7, 2015

(54) METHOD AND APPARATUS FOR ORGANIZING AND CONSOLIDATING PORTABLE DEVICE FUNCTIONALITY

(75) Inventors: Hideya Kawahara, Mountain View, CA (US); Akihiko Kusanagi, Tokyo (JP); Kanako Maeda, Tokyo (JP)

(73) Assignee: ORACLE AMERICA, INC., Redwood Shores, CA (US)

( * ) Notice: Subject to any disclaimer, the term of this patent is extended or adjusted under 35 U.S.C. 154(b) by 0 days.

(21) Appl. No.: 11/954,155

(22) Filed: Dec. 11, 2007

(65) Prior Publication Data

US 2009/0150574 A1 Jun. 11, 2009

(51) Int. Cl.
| | |
|---|---|
| G06F 3/00 | (2006.01) |
| G06Q 10/10 | (2012.01) |
| G06F 3/0482 | (2013.01) |
| G06Q 10/06 | (2012.01) |
| H04M 1/725 | (2006.01) |

(52) U.S. Cl.
CPC ............... *G06Q 10/10* (2013.01); *G06Q 10/06* (2013.01); *G06F 3/0482* (2013.01); *H04M 1/72566* (2013.01); *H04M 1/72569* (2013.01); *H04M 1/72572* (2013.01); *H04M 2250/60* (2013.01)

(58) Field of Classification Search
CPC ...... G06Q 10/06; G06Q 10/10; G06F 3/0482; H04M 2250/60; H04M 1/72566
USPC ............... 455/556.2; 379/142.01; 710/67, 18; 715/772
See application file for complete search history.

(56) References Cited

U.S. PATENT DOCUMENTS

| | | | |
|---|---|---|---|
| 6,845,408 B1 * | 1/2005 | Lemke et al. .................... | 710/18 |
| 7,058,733 B2 * | 6/2006 | Vong et al. ...................... | 710/18 |
| 7,594,050 B2 * | 9/2009 | Tysowski ......................... | 710/67 |
| 7,600,064 B2 * | 10/2009 | Knowles et al. ............... | 710/240 |
| 7,831,141 B2 * | 11/2010 | Wassingbo et al. ........... | 396/429 |
| 8,572,486 B2 * | 10/2013 | Yach .............................. | 715/703 |
| 2004/0102225 A1 * | 5/2004 | Furuta et al. .................. | 455/566 |
| 2004/0249894 A1 * | 12/2004 | Nishimura ..................... | 709/206 |
| 2005/0138066 A1 * | 6/2005 | Finke-Anlauff et al. .. | 707/104.1 |
| 2005/0197158 A1 * | 9/2005 | Silverbrook et al. ....... | 455/556.2 |
| 2005/0213511 A1 * | 9/2005 | Reece et al. ................... | 370/252 |
| 2006/0135127 A1 * | 6/2006 | Aarnio et al. ............... | 455/412.1 |
| 2006/0172768 A1 * | 8/2006 | Wei et al. ..................... | 455/556.1 |
| 2006/0242234 A1 * | 10/2006 | Counts et al. ................. | 709/204 |
| 2007/0099657 A1 * | 5/2007 | Scott ........................... | 455/556.2 |

(Continued)

OTHER PUBLICATIONS

Nathan Eagle: Using Mobile Phones to Model Compelx Social Systems, O'Reilly Network, Jun. 20, 2005, http://www.oreillynet.com/pub/a/network/2005/06/20/MITmedialab.html, downloaded Dec. 11, 2007, pp. 1 to 6.

(Continued)

*Primary Examiner* — Ernest Unelus
(74) *Attorney, Agent, or Firm* — Park, Vaughan, Fleming & Dowler LLP

(57) ABSTRACT

Some embodiments of the present invention provide a system that organizes and consolidates the functionality of a portable device. During operation, the system tracks the usage of at least one application and at least one data file by a user of the portable device. Next, the system determines usage-context information from the tracked usage and generates a chronological log that includes the tracked usage and the usage-context information. Finally, the system displays the chronological log to the user in a manner which enables the user to use the usage-context information to access the functionality of the portable device.

22 Claims, 4 Drawing Sheets

(56) References Cited

U.S. PATENT DOCUMENTS

| | | | |
|---|---|---|---|
| 2007/0165806 A1* | 7/2007 | Bocking et al. | 379/142.01 |
| 2007/0198314 A1* | 8/2007 | Andrew et al. | 705/8 |
| 2007/0206759 A1* | 9/2007 | Boyanovsky | 379/202.01 |
| 2008/0005184 A1* | 1/2008 | Myllyla et al. | 707/200 |
| 2008/0009325 A1* | 1/2008 | Zinn et al. | 455/566 |
| 2008/0126145 A1* | 5/2008 | Rackley, III et al. | 705/7 |
| 2008/0133526 A1* | 6/2008 | Haitani et al. | 707/7 |
| 2008/0133697 A1* | 6/2008 | Stewart et al. | 709/217 |
| 2008/0182555 A1* | 7/2008 | Madanes et al. | 455/411 |
| 2009/0013275 A1* | 1/2009 | May et al. | 715/765 |
| 2009/0100027 A1* | 4/2009 | Malik | 707/3 |
| 2009/0122198 A1* | 5/2009 | Thorn | 348/715 |
| 2009/0137278 A1* | 5/2009 | Haru et al. | 455/566 |
| 2010/0105360 A1* | 4/2010 | Klassen et al. | 455/412.1 |
| 2013/0318456 A1* | 11/2013 | Lacey et al. | 715/765 |

OTHER PUBLICATIONS

Nokia Lifeblog: "Log Your Life Via Your Phone", BBC News Technology, http://news.bbc.co.uk/2/hi/technology/3497596.stm, downloaded Dec. 11, 2007, pp. 1 to 3.

Nokia Lifeblog: "Lifeblog Means More Than Just Blogging", http://www.nokia.com/lifeblog downloaded Dec. 11, 2007, pp. 1 to 2.

CEATEC Japan 2007 News: Tagged World Project http//taggedworld.jp/ downloaded Dec. 11, 2007, p. 1.

Japan Society of Traffic Engineers: "Probe Person" http://www.probe-data.jp/eng/index.html downloaded Dec. 11, 2007, p. 1.

Minamikawa, Atsunori et al. "RFID Supplement for Mobile-Based Life Log System", IEEE Computer Society, 0-7695-2757, Proceedings of the 2007 International Symposium on Applications and the Internet Workshops.

\* cited by examiner

METHOD AND APPARATUS FOR ORGANIZING AND CONSOLIDATING PORTABLE DEVICE FUNCTIONALITY

BACKGROUND

1. Field

The present invention generally relates to portable devices. More specifically, the present invention relates to a method and apparatus for organizing and consolidating portable device functionality.

2. Related Art

Portable devices, such as mobile phones, personal digital assistants (PDAs), portable computers, and portable media players, have become increasingly versatile over the years. For example, a single portable device may function as a mobile phone, a web browser, a portable media player, an email client, a document editor, and a global positioning system (GPS) receiver. Similarly, portable computers such as tablet personal computers (PCs) may incorporate the functionality of a full operating system and one or more application suites. Hence, modern portable generally provide a variety of applications and store large amounts of documents, media, and/or other files in various formats.

To accommodate the increased versatility of a modern portable device, the various applications, menu items, files, and/or other software components which reside in the portable device are typically organized in a complex menu and/or directory hierarchy. A user of the portable device may have difficulty navigating through the hierarchy to find previously accessed files and/or applications and use the many functions provided by the portable device. In addition, the portable device may lack utilities to combine and/or link files, settings, and usage contexts from multiple applications. Consequently, the user may be unable to utilize the portable device efficiently without an intuitive mechanism for finding, retrieving, and associating user settings, features, and files on the portable device.

SUMMARY

Some embodiments of the present invention provide a system that organizes and consolidates the functionality of a portable device. During operation, the system tracks the usage of at least one application and at least one data file by a user of the portable device. Next, the system determines usage-context information from the tracked usage and generates a chronological log that includes the tracked usage and the usage-context information. Finally, the system displays the chronological log to the user in a manner which enables the user to use the usage-context information to access the functionality of the portable device.

In some embodiments, the system also obtains a log-preference from the user and formats the chronological log based on the log-preference.

In some embodiments, the log-preference is stored in a template.

In some embodiments, the log-preference is associated with at least one of an application, a file type, a graphical user interface (GUI) element, a text description, a level of detail, a chronological log item, the usage-context information, a privacy setting, and a layout.

In some embodiments, the portable device also sorts the tracked usage based on the log-preference and the usage-context information and generates a set of chronological logs based on results of the sorting.

In some embodiments, the portable device also transmits the chronological log to a location on a network.

In some embodiments, the location is associated with at least one of a contact of the user, a personal computer, a different portable device, and a host computer.

In some embodiments, the chronological log includes information associated with past, present, and future events.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention present a method and apparatus for organizing and consolidating the functionality of a portable device. Portable devices may include mobile phones, personal digital assistants (PDAs), global positioning system (GPS) receivers, portable media players, portable (e.g., laptop, tablet, etc.) computers, and/or other portable electronic devices.

Specifically, embodiments of the invention provide a method and apparatus which enables use of the portable device by generating and displaying a chronological log to a user of the portable device. The chronological log may be generated by tracking the user's usage of applications within the portable device and determining usage-context information from the tracked usage. The chronological log may include selectable log items that link to files and applications previously accessed by the user, thereby allowing the user to directly access the files and/or applications without navigating a complex menu and/or directory hierarchy on the portable device. The chronological log may also be customized to the user's preferences and needs. In addition, multiple chronological logs may be created to represent different uses (e.g., personal, business, family, etc.) of the portable device by the user.

Figure 1:
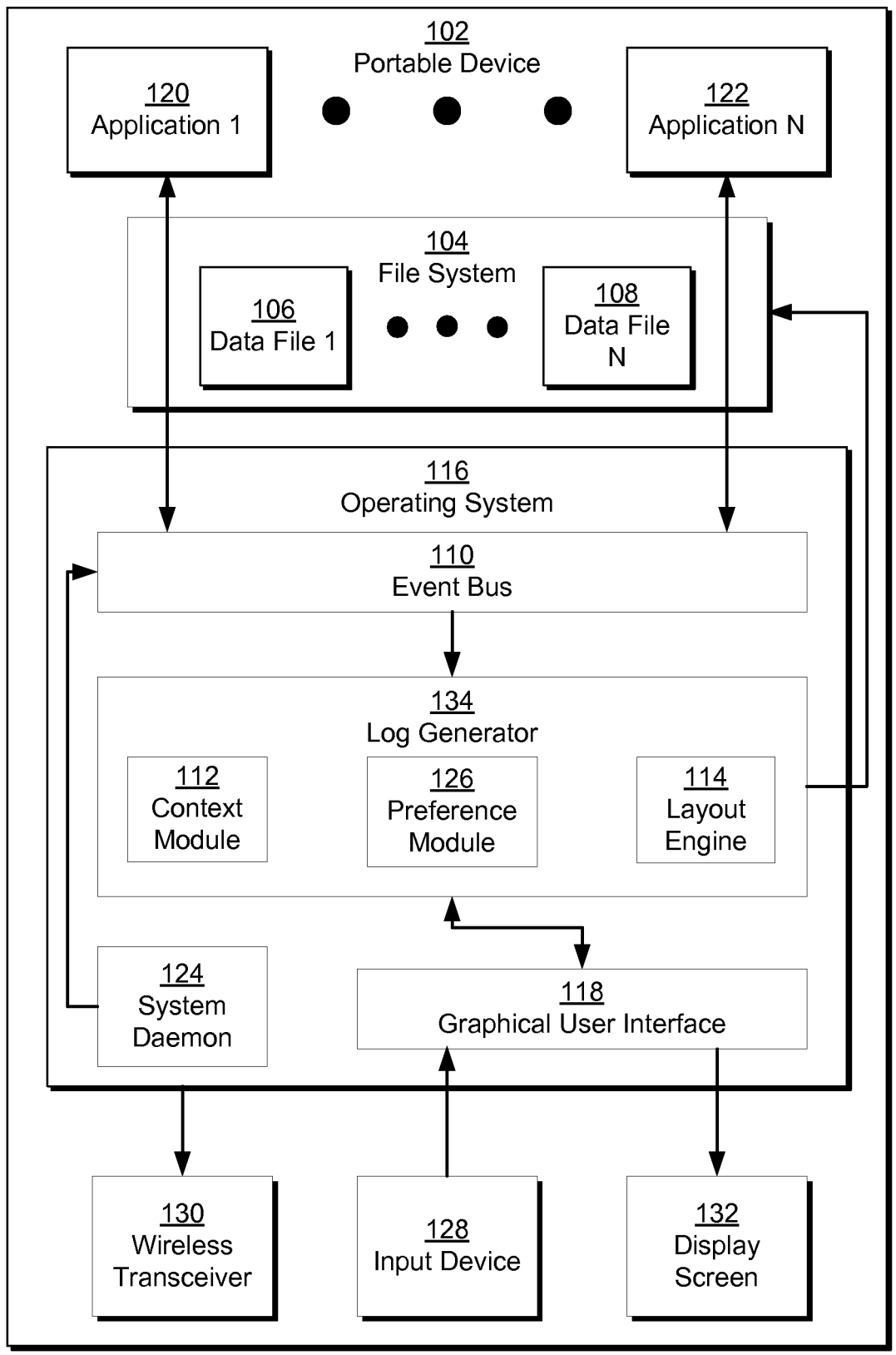
FIG. 1 shows a schematic diagram of a portable device in accordance with an embodiment of the present invention.

FIG. 1 shows a schematic diagram of a portable device in accordance with an embodiment of the present invention. As shown in FIG. 1, portable device 102 includes a file system 104, an operating system 116, an input device 128, a wireless transceiver 130, a display screen 132, and multiple applications (e.g., application 1 120, application n 122). Each of these components is described in further detail below.

Portable device 102 may correspond to a portable electronic device that provides one or more services or functions to a user. For example, portable device 102 may operate as a mobile phone, portable computer, global positioning system (GPS) receiver, portable media player, and/or graphing calculator. In addition, portable device 102 may include an operating system 116 that coordinates the use of hardware and software resources on portable device 102, as well as one or more applications (e.g., application 1 120, application n 122) that perform specialized tasks for the user. For example, portable device 102 may include applications such as an email client, an address book, a document editor, and/or a media player. To perform tasks for the user, applications may obtain access to hardware resources (e.g., processor, memory, I/O components, wireless transceiver, etc.) on portable device 102 from operating system 116. Applications may also interact with the user through a hardware and/or software framework provided by operating system 116, as is described below.

To enable interaction with the user, portable device 102 may include one or more hardware input/output (I/O) components, such as input device 128, wireless transceiver 130, and display screen 132. Each hardware I/O component may additionally be associated with a software driver (not shown) that allows operating system 116 and/or applications on portable device 102 to access and use the hardware I/O components.

Display screen 132 may be used to display images and/or text to one or more users of portable device 102. In one or more embodiments of the invention, display screen 132 serves as the primary hardware output component for portable device 102. For example, display screen 132 may allow the user(s) to view menus, icons, windows, emails, websites, videos, pictures, maps, documents, and/or other components of a graphical user interface (GUI) 118 provided by operating system 116. Those skilled in the art will appreciate that display screen 132 may incorporate various types of display technology to render and display images. For example, display screen 132 may be a liquid crystal display (LCD), an organic light-emitting diode (OLED) display, a surface-conducting electron-emitter display (SED), and/or other type of electronic display.

Input device 128 may function as the primary hardware input component of portable device 102. Specifically, input device 128 may allow the user to point to and/or select one or more areas of display screen 132 using a cursor, highlight, and/or other visual indicator. Input provided by the user using input device 128 may be processed by the corresponding software driver and sent to operating system 116 and/or one or more applications (e.g., application 1 120, application n 122) as one or more actions.

Input device 128 may receive user input using various methods, including touchscreens, touchpads, buttons, voice recognition, keypads, keyboards, and/or other input methods. In addition, multiple input devices may exist on portable device 102. Operating system 116 and/or the application(s) (e.g., application 1 120, application n 122) may use the input from the input device(s) to perform one or more tasks, as well as update GUI 118 in response. Images corresponding to GUI 118 may be sent by operating system 116 to a screen driver, which may display the images on display screen 132 as a series of pixels. As a result, the user may interact with portable device 102 by using input device 128 to provide input to operating system 116 and/or applications and receiving output from operating system 116 and/or applications through display screen 132.

Wireless transceiver 130 may allow portable device 102 to connect to one or more wireless networks, such as wireless local area networks (LANs) and/or mobile devices networks. Portable device 102 may also communicate with one or more locations on the network(s) by sending and/or receiving data over the network(s) using wireless transceiver 130. For example, portable device 102 may use wireless transceiver 130 to retrieve web pages, make calls, download and upload files, and send and receive emails over the network(s). Locations on the network(s) may include contacts of the user, personal computers, different portable devices, and host computers.

In one or more embodiments of the invention, data files (e.g., data file 1 106, data file n 108) associated with operating system 116 and/or applications on portable device 102 are stored in file system 104. These data files may include, for example, address book entries, images, media files, emails, documents, configuration files, log files, and/or other digital files. File system 104 may be associated with one or more storage devices (not shown) on portable device 102, such as disk drives, memory cards, and/or flash drives. The storage device(s) may act as repositories for the data files, which may be read from, written to, modified, and/or organized by file system 104. Applications may access the data files through one or more system calls to file system 104 provided by operating system 116.

As mentioned above, the user may use applications and data files on portable device 102 by interacting with GUI 118 through input device 128 and display screen 132. To enable access to the functionality of portable device 102, GUI 118 may include a variety of GUI elements, such as icons, menus, sub-menus, windows, toolbars, thumbnails, pop-ups, and/or other visual components. The GUI elements may also include text, labels, and/or text navigation to provide additional information and available actions to the user. The user may access one or more functions of portable device 102 through direct manipulation of one or more GUI elements. For example, the user may run an application by pointing to and selecting (e.g., double-clicking) an icon associated with the application. The user may also perform actions such as moving the cursor or visual indicator, scrolling, dragging, cutting, copying, pasting, and/or selecting an area of display screen 132.

Those skilled in the art will appreciate that portable device 102 may include a large number of applications and data files. For example, portable device 102 may include a full operating system and one or more application suites. Portable device 102 may also be used as a primary computing device by the user. However, portable device 102 may have limited I/O mechanisms that preclude the user from efficiently finding and using the various applications and data files within. For example, display screen 132 may have resolution limitations that prevent all utilities of portable device 102 from being displayed to the user at the same time. Similarly, input device 128 may use inefficient and/or unwieldy mechanisms (e.g., directional buttons) for scrolling through a large number of GUI elements on display screen 132.

To accommodate the limitations of display screen 132 and/or input device 128, GUI 118 may be organized into a hierarchy of menus, sub-menus, and/or directories. To find an application or data file, the user may be required to navigate the hierarchy by scrolling through GUI elements on each level of the hierarchy and selecting the correct GUI element to proceed to the next level. As a result, the user may have trouble finding and/or remembering the locations of applications and data files on portable device 102. Similarly, the user may forget usage contexts for previously used applications and/or data files, which may prevent the user from fully utilizing the applications and/or data files.

To assist the user in finding relevant applications and data files, portable device 102 may include one or more chronological logs that enable access to the functionality associated with the applications and data files. The chronological logs may be generated by a log generator 134 in operating system 116 and stored in file system 104 after generation for subsequent retrieval. The chronological logs may also be displayed to the user using GUI 118 and display screen 132. In one or more embodiments of the invention, log generator 134 generates one or more chronological logs from tracked usage of portable device 102 by the user. The chronological logs may also include usage-context information established from the tracked usage, as explained in further detail below.

As shown in FIG. 1, operating system 116 includes an event bus 110. Event bus 110 may store information obtained by tracking the usage of portable device 102 by the user. The tracked usage may be obtained from applications accessed by the user. The usage information may include shortcuts, pointers, references, etc. to the applications, specific tasks performed by the user with the applications, data files accessed by the user with the applications, timestamps, and/or other usage statistics associated with the applications.

Event bus 110 may also receive information from a system daemon 124 of operating system 116. System daemon 124 may provide system-related usage information, such as startup and shutdown times of portable device 102, global positioning system (GPS) and/or cellular tower coordinates, and/or other information from one or more hardware components (e.g., input device 128, wireless transceiver 130, display screen 132, camera, microphone, clock, etc.) on portable device 102. In one or more embodiments of the invention, log generator 134 obtains information stored in event bus 110 and generates one or more chronological logs from the information. The chronological logs may include, for example, log items that contain information about the tracked usage of portable device 102.

In one or more embodiments of the invention, the log items are selectable. In other words, the log items may include links (e.g., references, pointers, hyperlinks, shortcuts, etc.) to relevant applications, files, and/or functions of portable device 102. In one or more embodiments of the invention, the links in the log items allow the user to directly access a functionality of portable device 102 without extensive searching and/or navigating. The functionality may be accessed, for example, by clicking on a link within a log item and executing the relevant application, file, and/or function associated with the link. Chronological logs and log items are explained in further detail with respect to FIGS. 2A-2B below.

In addition, log generator 134 may establish usage-context information from the tracked usage of portable device 102. Specifically, a context module 112 within log generator 134 may obtain the usage-context information by processing and/or combining the tracked usage in event bus 110. For example, if the user has scheduled a vacation for a given time period in a calendar application of portable device 102, context module 112 may associate all pictures taken using portable device 102 during the time period with the vacation. The pictures may also be tagged with geographic coordinates obtained by wireless transceiver 130. Context module 112 may additionally obtain usage-context information from one or more data files, including the user's calls, emails, voicemails, documents, reminders, and/or scheduled events. Further, context module 112 may employ a variety of techniques for determining usage-context information from the tracked usage, such as text mapping, pattern recognition, and/or cross-referencing of information from multiple sources.

In one or more embodiments of the invention, the user may specify the number and types of chronological logs created by log generator 134. For example, the user may specify the creation of a chronological log for each business client, a chronological log for friends, and a chronological log for his/her family. The user may also provide log-preferences regarding the content and appearance of the chronological log(s). The log-preferences may be associated with applications, file types, GUI elements, text descriptions, levels of detail, chronological log items, usage-context information, and layouts of the chronological logs. The log-preferences may also be included in one or more templates that specify a default set of features to be included in the chronological log(s). As a result, the user may create a chronological log more quickly by selecting a template for the chronological log and customizing the template to his/her preferences.

In one or more embodiments of the invention, the user provides log-preferences to a preference module 126 in operating system 116 using input device 128. Alternatively, the user may upload a file containing a set of log-preferences to portable device 102 using wireless transceiver 130, for example. Log generator 134 may then generate one or more chronological logs based on the log-preferences. In addition, the chronological logs may be formatted according to the log-preferences using a layout engine 114 in log generator 134. The chronological logs may be formatted using a variety of text, language styles, fonts, icons, thumbnails, backgrounds, layouts, and/or other formatting parameters.

In one or more embodiments of the invention, the tracked usage of portable device 102 is sorted and placed into multiple chronological logs based on the user's log-preferences and the established usage-context information. For example, the user may identify contacts in his/her address book as personal and/or business contacts. The user may also designate certain parts of applications for business or personal use. For example, a horoscope application may be associated with the user's personal log, whereas a document management application may be associated with the user's business log. Context module 112 may then determine usage-context information from the tracked usage using the tags and designations, and log generator 134 may place information associated with each usage context in the appropriate chronological log. In addition, each chronological log may be formatted differently. For example, a business-oriented chronological log may include log items in a list format, whereas a socially oriented chronological log may use informal and/or slang language to describe log items.

The user may also specify privacy settings for the chronological log(s) using the log-preferences. Specifically, the user may allow or forbid sharing of the chronological log(s) with his/her contacts. For example, the user may share one or more chronological logs with friends, family, and/or business associates. The user may also allow others to edit the chronological log(s) and/or combine the user's chronological log(s) with their own chronological log(s). Similarly, the user may allow or forbid transmission of the chronological log(s) to one or more locations on a network accessed by wireless transceiver 130. The location(s) may be associated with a contact of the user, a personal computer, a different portable device, and a host computer.

In one or more embodiments of the invention, the chronological logs include past, present, and future information. For example, the chronological logs may display activities, events, applications, files, and/or other elements associated with the past; the portable device's current status and/or real-time information such as stock quotes or weather conditions; and scheduled events, reminders, forecasts, and/or other information associated with the future. Because the chronological logs may be time-ordered, the user may quickly find information in the chronological logs by browsing, searching, and/or jumping to a specific date. In addition, the usage-context information in the chronological logs may further assist the user in retrieving and/or using applications and/or data files, as well as act as a record of the user's activities in the past, present, and/or future.

Figure 2A:
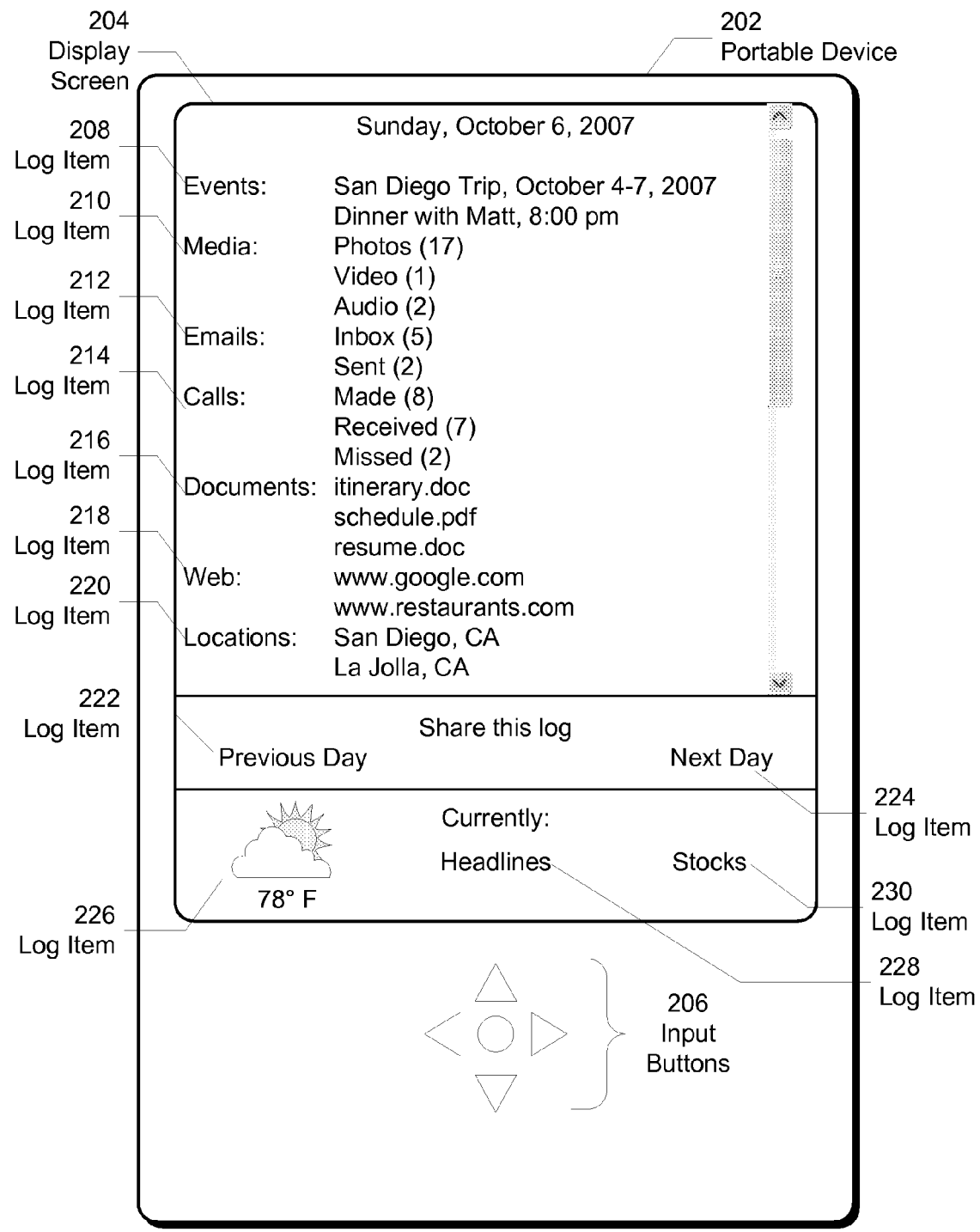
FIGS. 2A-2B show exemplary chronological logs in accordance with an embodiment of the present invention.

FIG. 2A shows an exemplary chronological log in accordance with an embodiment of the present invention. The chronological log is shown on a portable device 202 with a display screen 204 and a set of input buttons 206. In addition, the chronological log displays tracked usage of portable device 202 on Oct. 6, 2007. The chronological log includes a number of log items 208-230. Each log item 208-230 may represent a file, directory, application, and/or sensor on portable device 202. In addition, log items 208-230 may be associated with different parts of the chronological log, as explained below.

As shown in FIG. 2A, the chronological log includes a list of log items 208-220 related to events, media, emails, calls, documents, web browsing, and locations of the user. Log items 208-220 may correspond to applications and/or data files accessed by the user, as well as readings from one or more sensors of portable device 202, on Oct. 6, 2007. For example, log item 208 may include information from a calendar application. Log item 210 may be associated with a camera sensor, microphone sensor, and/or multimedia application. Log item 212 may be associated with an email client and email files, and log item 214 may be associated with a mobile phone function and address book. Log item 216 may be associated with a document viewer, manager, and/or editor. Log item 218 may correspond to the history from a web browser. Finally, log item 220 may include information from the calendar, mobile phone, and/or a GPS receiver.

Each log item 208-220 includes information related to the tracked usage of portable device 202 on Oct. 6, 2007. The information may include details about the tracked usage, as well as usage-context information determined from the tracked usage. For example, log item 216 for "Documents" may include only tracked usage of three data files (i.e., itinerary.doc, schedule.pdf, resume.doc) accessed by the user on Oct. 6, 2007. However, log items 208-220 may include extra usage-context information obtained by combining and/or processing the information from multiple applications, files, and/or sensors. For example, log item 220 for "Locations" lists the locations of "San Diego, Calif." and "La Jolla, Calif.". The locations may be obtained by combining geographic information received by one or more sensors of portable device 202, events in the calendar application, and/or data mined from emails and documents accessed by the user.

The chronological log may also include a section for accessing other dates stored in the chronological log. Specifically, log items 222-224 may allow the user to access other areas of the timeline spanned by the chronological log. The timeline may include past dates, the present date, and/or future dates. Log item 222 may allow the user to view the portion of the chronological log beginning with Oct. 5, 2007, while log item 224 may allow the user to view the portion beginning with Oct. 7, 2007. Log items 222-224 may also be continually selected by the user to reach a desired date in the past, present, or future. Alternatively, the user may jump to a date using a calendar and/or a keyword or date search.

Log items 226-230 may correspond to applications, files, and/or functions associated with the present. For example, log item 226 may display the current weather, log item 228 may link to an application and/or website displaying current news headlines, and log item 230 may link to an application and/or website with stock ticker information. Those skilled in the art will appreciate that log items 226-230 may also include future information, such as weather and stock forecasts.

As mentioned above, log items 208-230 may be selectable. In other words, log items 208-230 may include links (e.g., hyperlinks, references, pointers, shortcuts, etc.) to corresponding applications, files, and/or directories, thus allowing the user to quickly access the functionality of portable device 202 by selecting the links. For example, the user may access an email client of portable device 202 by using input buttons 206 to select the portion of log item 212 corresponding to "Emails". The user may also jump to an inbox and/or sent mail folder of the email client by selecting other portions of log item 212 (i.e., "Inbox (5)", "Sent (2)"). In one or more embodiments of the invention, scrolling, pointing, and selection actions by the user are received using input buttons 206. Those skilled in the art will appreciate that other input methods, such as voice recognition, touchscreens, and/or touchpads may also be used.

As described above, the user may customize the chronological log by providing log-preferences to portable device 202. As a result, the user may specify the layout of the chronological log, the types of log items 208-230 included in the chronological log, GUI elements (e.g., text, icons, thumbnails, etc.) displayed in the chronological log, the level of detail included with log items, and/or privacy settings for the chronological log. In addition, the user may select a template for the chronological log. The template may be based on a specific use of portable device 202, such as business, personal, or vacation. The template may include a basic layout, a default display preference (e.g., text, icons, abbreviations, etc.), and a display order. The user may then customize the template by adding and/or removing log items and providing log-preferences about the types of usage, contacts, applications, files, etc. associated with the chronological log.

Figure 2B:
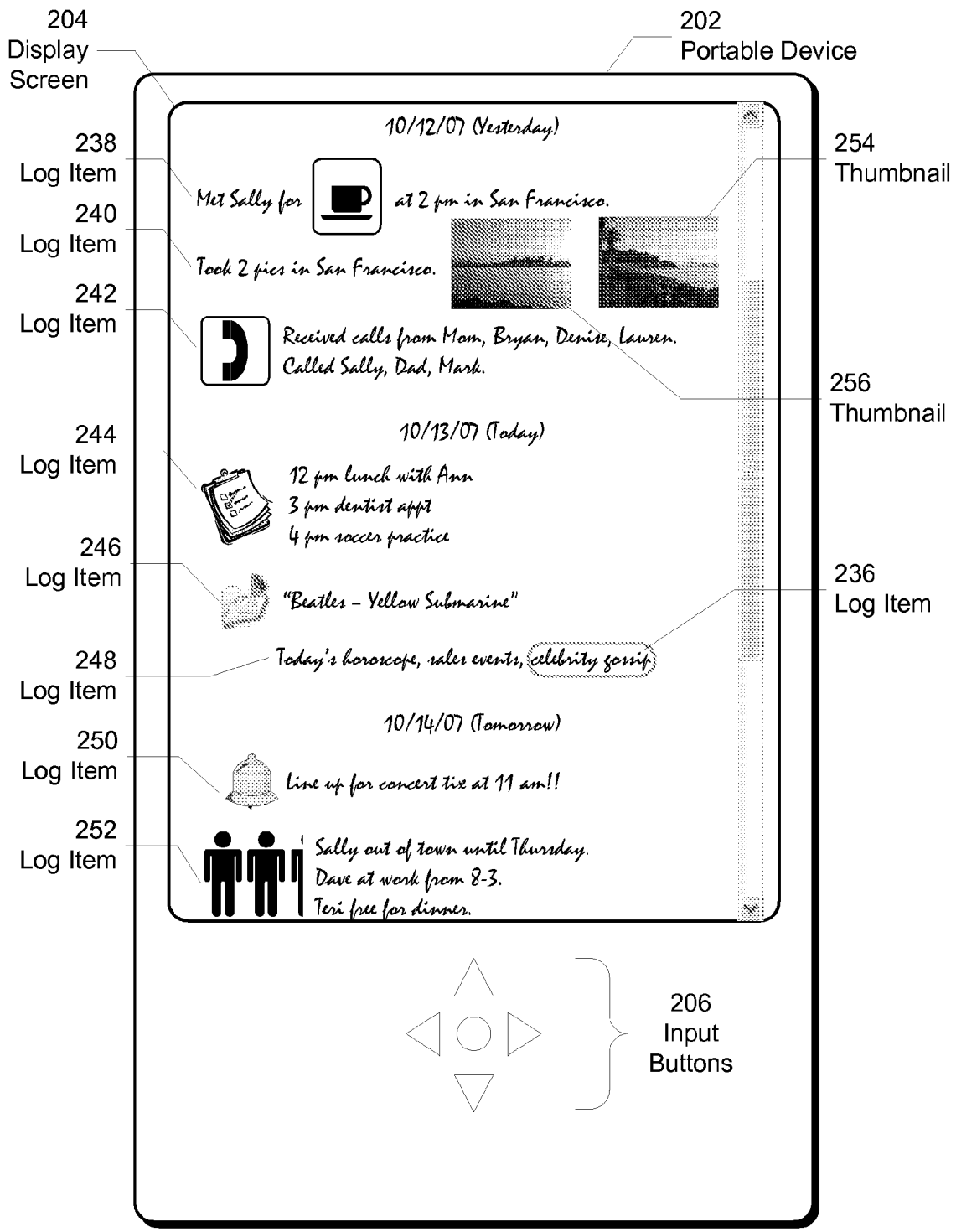

FIG. 2B shows an exemplary chronological log in accordance with one or more embodiments of the invention. As with FIG. 2A, the chronological log of FIG. 2B is viewed on a display screen 204 of a portable device 202. In addition, input buttons 206 on portable device 202 may allow the user to scroll through the chronological log, point to log items 236-252, and/or select log items 236-252. However, the chronological log of FIG. 2B differs in content, formatting, and organization from the chronological log of FIG. 2A. In other words, the chronological logs of FIG. 2A and FIG. 2B may be used for different purposes and/or may be associated with different users. For example, the chronological log of FIG. 2A may be used by a professional for business purposes, while the chronological log of FIG. 2B may be used by a teenager or young adult for personal and/or social purposes.

As shown in FIG. 2B, icons may be used in log items 236-252. In addition, the icons may serve as visual descriptors of the log items. For example, log item 238 may correspond to a scheduled event in the user's calendar. The icon displayed in log item 238 may represent an activity corresponding to the scheduled event. Similarly, log item 242 may represent the user's call log on portable device 202. The icon of log item 242 may serve as a concise visual representation of the user's call log; details of the call log may be displayed in text to the right of the icon. As with FIG. 2A, the user may access the functionality of portable device 202 by pointing to and selecting various parts of log items 236-252, including the icons and accompanying text. Log item 236 is highlighted, indicating that the user has pointed to log item 236 using input buttons 206. The user may then launch an application, website, and/or other utility associated with log item 236 by selecting log item 236 using input buttons 206.

Log items 236-252 may also include other GUI elements, such as thumbnails 254-256. In particular, thumbnails 254-256 may correspond to log item 240 and include links to images taken by the user on Oct. 12, 2007. Log items 238-240 may additionally include usage-context information from a GPS receiver that associates log items 238-240 with the location of San Francisco.

The chronological log of FIG. 2B includes information for a current date (i.e., Oct. 13, 2007), a past date (i.e., Oct. 12, 2007), and a future date (i.e., Oct. 14, 2007). The information for the past date may include tracked usage of portable device 202 and associated usage-context information. On the other hand, the information for the current date may include a combination of scheduled events, currently opened files (e.g., log item 246 may represent a current musical track playing on portable device 202), and/or utilities related to the current date (e.g., log item 236, log item 248). The information for the future date may include log items associated with reminders and events. As with FIG. 2A, the user may provide one or more log-preferences regarding the layout, content, appearance, and/or flow of the chronological log. For example, the user may choose relevant applications, files, and/or sensors to track, the font, the types and styles of icons, the level of detail, the language style (e.g., formal, Internet terminology, slang, etc.), a template, and/or other elements included in the chronological log.

Figure 3:
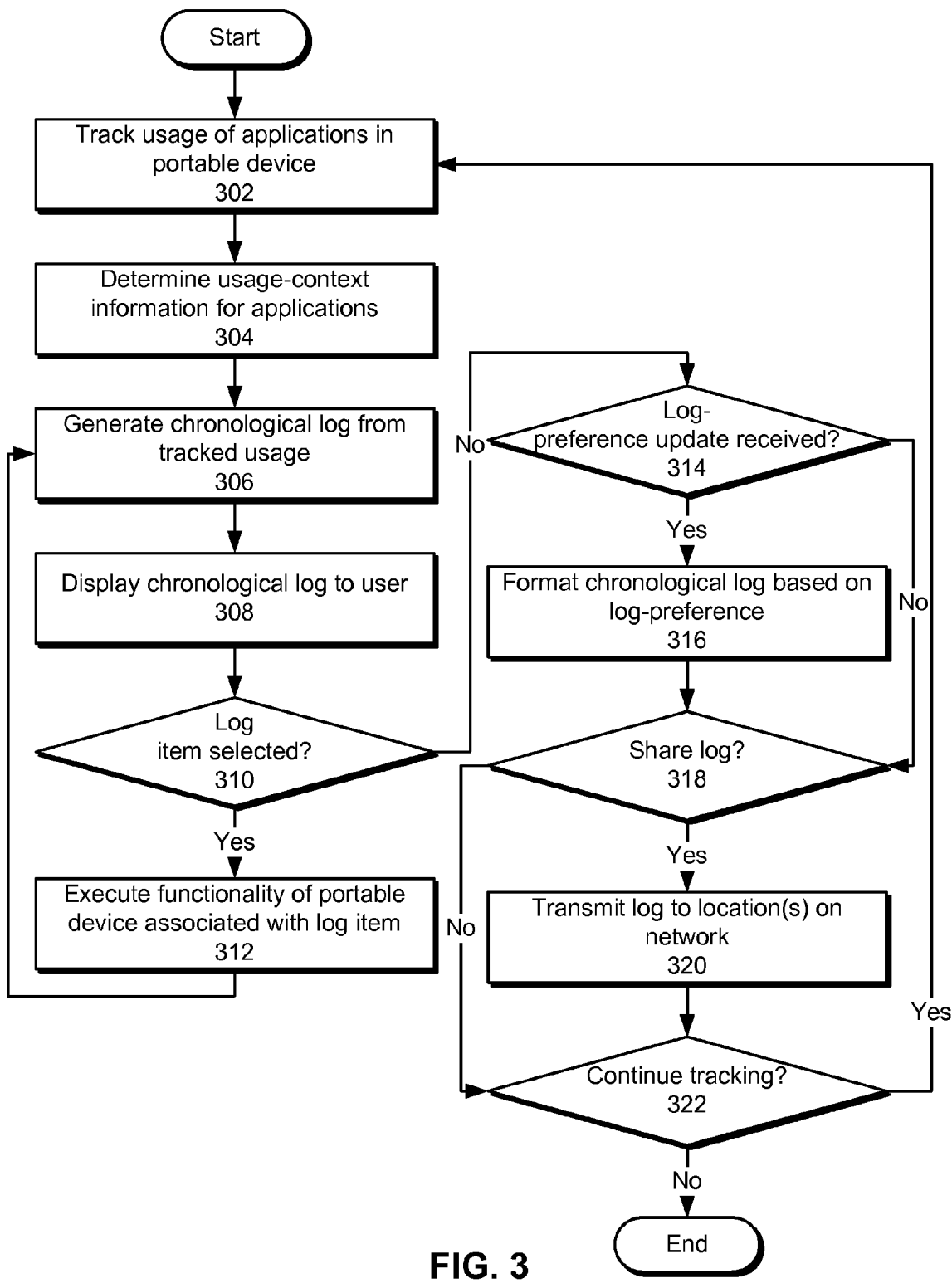
FIG. 3 shows a flow chart of a process which enables use of a portable device in accordance with an embodiment of the present invention.

FIG. 3 shows a flow chart enabling use of a portable device in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, the usage of applications by a user of the portable device is tracked (operation 302). The usage may be tracked by the applications, by the operating system, and/or by one or more system daemons, as described above with respect to FIG. 1. The tracked usage may also be placed in an event bus, such as event bus 110 of FIG. 1, for incorporation into a chronological log. Usage-context information is then determined for the applications from the tracked usage (operation 304). The usage-context information may be obtained by cross-referencing and/or processing data from multiple applications, data files, and/or sensors. For example, pictures and video from a certain time period may be tagged with events in a calendar corresponding to the time period and/or with geographic coordinates from the time period. Similarly, files associated with business contacts of the user may be classified as "business" files.

A chronological log is generated from the tracked usage (operation 306). The chronological log may also include the usage-context information. For example, the chronological log may include pictures taken by the user, as well as accompanying tags (e.g., related events, geographic coordinates, timestamps, etc.) as descriptors of the pictures. Further, the chronological log may include selectable log items that enable direct access to various functions of the portable device. Next, the chronological log is displayed to the user (operation 308). The user may browse and/or search the contents of the chronological log to find relevant applications, files, and/or usage-context information. For example, the user may seek pictures from a particular event and/or location. As mentioned above, the pictures may be tagged with usage-context information from the event and/or location. By browsing and/or searching the chronological log for log items related to the event and/or location, the user may be able to find the pictures.

To access a functionality of the chronological log, the user may select a log item (operation 310). If the user has selected a log item, the functionality associated with the log item is executed (operation 312). To select the log item, the user may point to and click on the log item using one or more input devices of the portable device. The clicking may initiate the execution of the application associated with the log item; trigger the activation of a sensor (e.g., camera, microphone, etc.) in the portable device; and/or open one or more data files associated with the log item. For example, the user may double-click on a thumbnail of a picture to open the picture. By using the chronological log, the user is able to find and access the functionality in a consolidated and organized fashion without navigating a complex hierarchy of menus, GUI elements, and windows. Once the functionality associated with the log item is executed, the chronological log may be updated (operation 306) and displayed again to the user (operation 308).

The user may also specify updates to one or more log-preferences (operation 314) for the chronological log. The log-preferences may be stored in one or more templates chosen by the user. Similarly, one or more default log-preferences and/or templates may be used to generate chronological logs in the absence of user-provided log-preferences. The log-preferences may also be associated with applications, file types, GUI elements, text descriptions, levels of detail, chronological log items, usage-context information, and layouts of the chronological log. If a log-preference update is received from the user, the chronological log is formatted based on the log-preference (operation 316). The log-preference(s) may also specify the number of chronological logs to generate and the type of information in each log. If multiple chronological logs are used, the tracked usage may be sorted and placed into the chronological logs according to the usage-context information and the log-preferences.

The user may also share the log (operation 318). Specifically, the user may provide a privacy setting for the chronological log using one or more log-preferences. The privacy setting may allow or prohibit outside access to the chronological log. For example, the privacy setting may allow certain groups of people (e.g., friends, family, acquaintances, etc.) to view and/or edit the log. If the log is to be shared, the log is transmitted to one or more locations on the network (operation 320). As mentioned above, the locations may be associated with a contact of the user, a personal computer, a different portable device, and a host computer.

The user's usage of the portable device may continue to be tracked (operation 322). If the tracking continues (operation 302), a new chronological log is generated, used, formatted, and/or shared (operations 304-320) based on the user's preferences. Alternatively, an existing chronological log may be updated with the newer tracked usage and/or usage-context information. The tracking may continue until the portable device is no longer used and/or the user has discontinued the creation of chronological logs in the portable device.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present description is defined by the appended claims.

What is claimed is:

1. A method comprising:
using at least one processor for tracking usage of applications within a portable device by a user, wherein tracking the usage comprises creating a first log item in response to a first application capturing a photo through a camera on the portable device at a first time, and a second log item in response to a second event, which corresponds to a second application's execution on the portable device at a second time;
generating at least one chronological log for the user from the tracked usage by:
creating a first visual representation of the first log item, wherein the first visual representation displays a thumbnail of the photo that was captured by the first application through the camera on the portable device;
creating a second visual representation of the second log item; and
ordering, based at least in part on the first time and the second time, the first visual representation and the second visual representation within the at least one chronological log;
displaying the at least one chronological log in a manner that enables user access to functionality of the portable device from the displayed chronological log such that the first visual representation is selectable to cause a third application to perform a first function with respect to the first log item and the second visual representation is selectable to cause a fourth application to perform a second function with respect to the second log item, wherein:
the third application is different from the fourth application;
the third application comprises the first application or another application associated with the first log item;
the fourth application comprises the second application or another application associated with the second log item; and
in response to a selection of the first visual representation, causing the third application to perform the first function with respect to the first log item.

2. The method of claim 1, further comprising:
obtaining a log-preference from the user; and
formatting the displayed chronological log based on the log-preference.

3. The method of claim 2, wherein the log-preference is associated with at least one of an application, a file type, a graphical user interface (GUI) element, a text description, a level of detail, a chronological log item, usage-context information, a privacy setting, and a layout.

4. The method of claim 3, further comprising:
sorting the tracked usage based on the log-preference and the usage-context information, wherein the at least one chronological log is generated based on results of the sorting.

5. The method of claim 1, further comprising:
transmitting the at least one chronological log to a location on a network, wherein the location is associated with at least one of a contact of the user, a personal computer, a different portable device, and a host computer.

6. The method of claim 1, wherein the photo was created by the user using the first application prior to the at least one chronological log being generated.

7. The method of claim 1, wherein the first function comprises displaying the thumbnail.

8. The method of claim 1, wherein the at least one chronological log comprises past events and future events, and
wherein displaying the at least one chronological log comprises displaying one or more of the past events and one or more of the future events by separating the one or more of the past events and the one or more of the second events in the display.

9. The method of claim 1, wherein:
the third application is an application for viewing pictures.

10. The method of claim 1, wherein:
the second log item is associated with a scheduled event;
the second visual representation displays a description of the scheduled event;
the fourth application is a calendar application; and
performing the second function comprises launching the calendar application to view the schedule event.

11. The method of claim 1, wherein:
the second log item is associated with a phone call;
the second visual representation displays a name of a contact;
the fourth application is an address book or a phone application.

12. The method of claim 1, wherein:
the second log item is associated with musical track;
the second visual representation displays a title and artist name of the musical track;
the fourth application is a media player.

13. A portable device, comprising:
a set of applications accessed by a user of the portable device;
an event bus in an operating system in the portable device configured to track usage by the user of at least one application in the set of applications, wherein, while tracking the usage, the event bus is configured to create a first log item in response to a first application capturing a photo through a camera on the portable device at a first time, and a second log item in response to a second event, which corresponds to a second application's execution on the portable device at a second time;
a log generator configured to generate at least one chronological log for the user from the tracked usage by:
creating a first visual representation of the first log item, wherein the first visual representation displays a thumbnail of the photo that was captured by the first application through the camera on the portable device;
creating a second visual representation of the second log item; and
ordering, based at least in part on the first time and the second time, the first visual representation and the second visual representation within the at least one chronological log; a display screen configured to display the at least one chronological log in a manner that enables user access to functionality of the portable device from the displayed chronological log such that the first visual representation is selectable to cause a third application to perform a first function with respect to the first log item and the second visual representation is selectable to cause a fourth application to perform a second function with respect to the second log item, wherein:
the third application is different from the fourth application;
the third application comprises the first application or another application associated with the first log item;
the fourth application comprises the second application or another application associated with the second log item; and an invocation module configured to, in response to a selection of the first visual representation, cause the third application to perform the first function with respect to the first log item.

14. The portable device of claim 13, further comprising:
a preference module configured to obtain a log-preference from the user,
wherein the log generator further comprises a layout engine configured to format the displayed chronological log based on the log-preference.

15. The portable device of claim 14, wherein the log-preference is associated with at least one of an application, a file type, a graphical user interface (GUI) element, a text description, a level of detail, a chronological log item, the usage-context information, a privacy setting, and a layout.

16. The portable device of claim 15,
wherein the portable device further comprises a context module configured to sort the tracked usage based on the log-preference and usage-context information, and
wherein the log generator is configured to generate the at least one chronological log based on results of the sorting.

17. The portable device of claim 13, further comprising a wireless transceiver configured to transmit the at least one chronological log to a location on a network, wherein the location is associated with at least one of a contact of the user, a personal computer, a different portable device, and a host computer.

18. A non-transitory computer-readable storage medium storing instructions that when executed by a computer cause:
using at least one processor for tracking usage of applications within a portable device by a user, wherein tracking the usage comprises creating a first log item in response to a first application capturing a photo through a camera on the portable device at a first time, and a second log item in response to a second event, which corresponds to a second application's execution on the portable device at a second time;
generating at least one chronological log for the user from the tracked usage by:
creating a first visual representation of the first log item, wherein the first visual representation displays a thumbnail of the photo that was captured by the first application through a the camera on the portable device;
creating a second visual representation of the second log item; and
ordering, based at least in part on the first time and the second time, the first visual representation and the second visual representation within the at least one chronological log;
displaying the at least one chronological log in a manner that enables user access to functionality of the portable device from the displayed chronological log such that the first visual representation is selectable to cause a third application to perform a first function with respect to the first log item and the second visual representation is selectable to cause a fourth application to perform a second function with respect to the second log item, wherein:
the third application is different from the fourth application;
the third application comprises the first application or another application associated with the first log item;
the fourth application comprises the second application or another application associated with the second log item; and
in response to a selection of the first visual representation, causing the third application to perform the first function with respect to the first log item.

19. The non-transitory computer-readable storage medium of claim 18, further storing instructions that when executed by the computer cause:
obtaining a log-preference from the user; and
formatting the displayed chronological log based on the log-preference.

20. The non-transitory computer-readable storage medium of claim 19, wherein the log-preference is associated with at least one of an application, a file type, a graphical user interface (GUI) element, a text description, a level of detail, a chronological log item, usage-context information, a privacy setting, and a layout.

21. The non-transitory computer-readable storage medium of claim 20, further storing instructions that when executed by the computer cause:
sorting the tracked usage based on the log-preference and the usage-context information, wherein the at least one chronological log is generated based on results of the sorting.

22. The non-transitory computer-readable storage medium of claim 18, further storing instructions that when executed by the computer cause: transmitting the at least one chronological log to a location on a network, wherein the location is associated with at least one of a contact of the user, a personal computer, a different portable device, and a host computer.

* * * * *

UNITED STATES PATENT AND TRADEMARK OFFICE
CERTIFICATE OF CORRECTION

PATENT NO.         : 9,076,124 B2
APPLICATION NO.    : 11/954155
DATED              : July 7, 2015
INVENTOR(S)        : Kawahara et al.

It is certified that error appears in the above-identified patent and that said Letters Patent is hereby corrected as shown below:

Title Page, Item (56), column 2, under other publication, line 1, delete "Compelx" and insert -- Complex --, therefor.

In the Claims

In column 12, line 9, in claim 9, delete "pictures." and insert -- pictures; and performing the first function comprises launching the application for viewing pictures to view a larger image of the photo. --, therefor.

In column 13, line 46, in claim 18, delete "a the" and insert -- the --, therefor.

Signed and Sealed this
Fifth Day of July, 2016

Michelle K. Lee
*Director of the United States Patent and Trademark Office*